Patented Sept. 13, 1932

1,877,020

UNITED STATES PATENT OFFICE

PAUL NAWIASKY, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

THE PROCESS OF IMPROVING HALOGEN DERIVATIVES OF N-DIHYDRO-1.2.2'.1'-ANTHRAQUINONEAZINE

No Drawing. Application filed April 25, 1930, Serial No. 447,415, and in Germany May 10, 1929.

The present invention relates to the production of pure halogen derivatives of N-dihydro-1.2.2'.1'-anthraquinoneazine.

I have found that when a manganese oxide, which term is to be understood as comprising manganese oxides of a higher oxidation stage than manganous oxide but not higher than manganese dioxide, is allowed to act in sulphuric acid solution on a halogen derivative of N-dihydro-1.2.2'.1'-anthraquinoneazine, a considerable improvement in respect to fastness to chlorine and purity is obtained. In these dyestuffs it is possible in many cases to combine the production of the halogen derivatives with the subsequent treatment with the aforesaid oxidizing agents in one operation.

The following examples will further illustrate the nature of this invention but the invention is not restricted to these examples.

Example 1

2 parts of a commercial N-dihydro-1.2.2'.1'-anthraquinoneazine not fast to chlorine are dissolved in 20 parts of sulphuric acid of 66° Baumé. 1 part of water is then allowed to run in slowly whilst well stirring and 0.3 part of a nitrose (a solution of nitrosylsulphuric acid in sulphuric acid) of which 400 grams corresponding to 47 grams $HNO_2$, are added. Chlorine is then passed in at from 50° to 60° centigrade until the chlorination has progressed to approximately the formation of a monochlor-N-dihydro-1.2.2'.1'-anthraquinoneazine. Nitrose may conveniently be added again during the course of the reaction. The superfluous chlorine is then displaced by passing in a stream of dry air until it is removed as completely as possible; about 0.5 part of water is allowed to run in and 1 part of finely ground natural manganese dioxide, which may conveniently be made into a thin paste with 5 parts of sulphuric acid of 66° Baumé is added. The mass is then stirred at from 50° to 60° C. until a sample taken therefrom and worked up shows no further improvement in the fastness of the dyestuff to chlorine. The dyestuff, which has separated partially in the form of a sulphate of the azine is then brought into solution by the addition, for example of 8 parts of a 10 per cent oleum and the sulphuric acid solution is allowed to run in luke warm water. If it is desired to obtain the dyestuff as a hydroazine, the dyestuff may be reduced before the sulphuric acid solution is allowed to run into water, by the addition of reducing agents, such as crude carbolic acid. The dyestuff obtained dyes cotton in clear shades which are faster to chlorine than the product worked up without the subsequent treatment with manganese dioxide.

Example 2

10 parts of a dichlor-N-dihydro-1.2.2'.1'-anthraquinoneazine prepared according to the example of U. S. application Ser. No. 234,032, filed No. 17, '27 and separated without fractionation by means of dilute sulphuric acid are dissolved in 100 parts of sulphuric acid of 66° Baumé; 5 parts of water are slowly dropped in and finally 2 parts of manganese dioxide, preferably made into a thin paste with 10 parts of sulphuric acid of 66° Baumé, are added. The stirring of the mass is continued for about five hours at from 55° to 60° C. then diluted with 8 parts of oleum of 10 per cent and finally allowed to run into a large excess of warm water at 60° C. The dyestuff, when worked up in the usual way, dyes with greater purity and is faster to chlorine than the product used as raw material.

What I claim is:—

1. A process of improving halogen derivatives of N-dihydro-1.2.2'.1.-anthraquinoneazine, which comprises treating a halogen derivative of N-dihydro-1.2.2'.1'-anthraquinoneazine in sulphuric acid solution with a manganese oxide.

2. A process of improving halogen derivatives of N-dihydro-1.2.2'.1.-anthraquinoneazine, which comprises treating a halogen derivative of N-dihydro-1.2.2'.1'-anthraquinoneazine in sulphuric acid solution with manganese dioxide.

In testimony whereof I have hereunto set my hand.

PAUL NAWIASKY.